United States Patent
Lee et al.

[19]

[11] Patent Number: 5,828,764
[45] Date of Patent: Oct. 27, 1998

[54] APPARATUS FOR CONTROLLING AUDIO RECORDING BIAS

[75] Inventors: Hai-wook Lee, Suwon, Rep. of Korea; Igor G. Vikulov, Ljuberzy, Russian Federation

[73] Assignee: Samsung Electronics Co., Ltd., Kyungki-Do, Rep. of Korea

[21] Appl. No.: 795,242

[22] Filed: Feb. 10, 1997

[30] Foreign Application Priority Data

Nov. 9, 1996 [KR] Rep. of Korea ............... 1996 53082

[51] Int. Cl.⁶ .................................................... H03G 3/00
[52] U.S. Cl. ............................ 381/107; 360/25; 360/66
[58] Field of Search ................... 360/25, 66; 381/104, 381/107, 108

[56] References Cited

U.S. PATENT DOCUMENTS

| | | | |
|---|---|---|---|
| 4,263,624 | 4/1981 | Gundry | 360/25 |
| 4,344,094 | 8/1982 | Ohtake et al. | 360/66 |
| 4,454,548 | 6/1984 | Jensen | 360/66 |
| 4,553,179 | 11/1985 | Inami et al. | 360/66 |

FOREIGN PATENT DOCUMENTS

| | | | |
|---|---|---|---|
| 0 312 404 A2 | 10/1988 | European Pat. Off. | G11B 5/03 |
| 0 312 404 | 4/1989 | European Pat. Off. | G11B 5/03 |

Primary Examiner—Forester W. Isen
Attorney, Agent, or Firm—Sughrue, Mion, Zinn, Macpeak & Seas, PLLC

[57] ABSTRACT

An apparatus for controlling an audio recording bias is provided for improving a signal-to-noise (S/N) ratio in a high-frequency region of a recording signal by controlling a bias when an audio signal is recorded. The apparatus includes a high-pass filter for passing only high frequency components of an input audio signal, and a bias signal generator for generating an oscillating bias signal which is inversely proportional to the level of the high-pass filtered audio signal, and is of a predetermined level in the middle- and low-frequencies of the input audio signal. In the above-described apparatus, a bias level is controlled in the high-frequency region of an input audio signal so that the saturation of the audio signal in the high-frequency region is prevented to thereby expand a frequency area of the signal being recorded. Also, the level of the recording signal is heightened compared to the conventional art, thereby improving the S/N ratio in the high-frequency region.

4 Claims, 1 Drawing Sheet

APPARATUS FOR CONTROLLING AUDIO RECORDING BIAS

BACKGROUND OF THE INVENTION

The present invention relates to an apparatus for recording an audio signal, and more particularly, to an apparatus for improving the signal-to-noise (S/N) ratio of the high frequency components of an audio signal by controlling the bias level during the recording of the audio signal.

Biasing methods generally employed in magnetic audio recording superpose a predetermined bias signal on the input audio signal in order to record a signal that exhibits improved linearity and that is not shifted on the hysteresis magnetization curve of the magnetic recording medium. These methods include both DC-based methods and AC-based methods. Presently, the AC-based biasing methods, in which a sinusoidal AC signal having a frequency between 30 and 200 KHz is superposed on the audio input signal, are widely used.

However, conventional AC-based biasing methods degrade the overload characteristic of the input audio signal because of the limited magnetization capability of the audio recording head. Thus, if the magnitude of the input audio signal is increased to improve the S/N ratio, the portions of the input audio signal over a predetermined magnitude reach a state of saturation, which the head cannot accept due to a self-biasing effect in the high frequency region during the recording. Consequently, it is difficult to record the high frequency components of the signal without a distortion.

SUMMARY OF THE INVENTION

To solve the above problem, it is an object of the present invention to provide an audio recording bias control apparatus that prevents the saturation of the high frequency components of the input audio signal by controlling the bias during the recording.

To accomplish the above object, there is provided an audio recording bias control apparatus wherein the input audio signal is applied to two parallel paths. One path includes an amplifier and an equalizer for amplifying and equalizing the input audio signal. The other path includes a high-pass filter for passing only the high frequency components of the input audio signal, and a bias signal generator for generating an oscillating bias signal. The signals from the two paths are added together before being applied to the magnetic head.

The oscillating bias signal is a combination of a first bias signal which is inversely proportional to the level of the high-pass filtered audio signal, and a second oscillating bias signal of a predetermined level in the middle- and low-frequencies of the input audio signal.

The bias signal generator comprises: a detector for detecting the upper and lower peak levels of the high-pass filtered audio signal; an oscillator for generating a bias oscillating signal of a predetermined frequency to bias the input audio signal when recorded; a multiplier for multiplying the bias oscillating signal by an output signal of the detector and generating a multiplied output signal; a differential amplifier for generating a controlling bias signal as a differential signal of the multiplied output signal and the bias oscillating signal; and a level controller for generating the controlled bias oscillating signals proportional to the level of the controlling bias signal.

BRIEF DESCRIPTION OF THE DRAWINGS

The above object and the advantages of the present invention will become more apparent by describing in detail a preferred embodiment thereof with reference to FIG. 1, which is a schematic view of an apparatus for controlling the audio recording bias according to a preferred embodiment of the present invention.

DETAILED DESCRIPTION OF THE INVENTION

Figure 1:
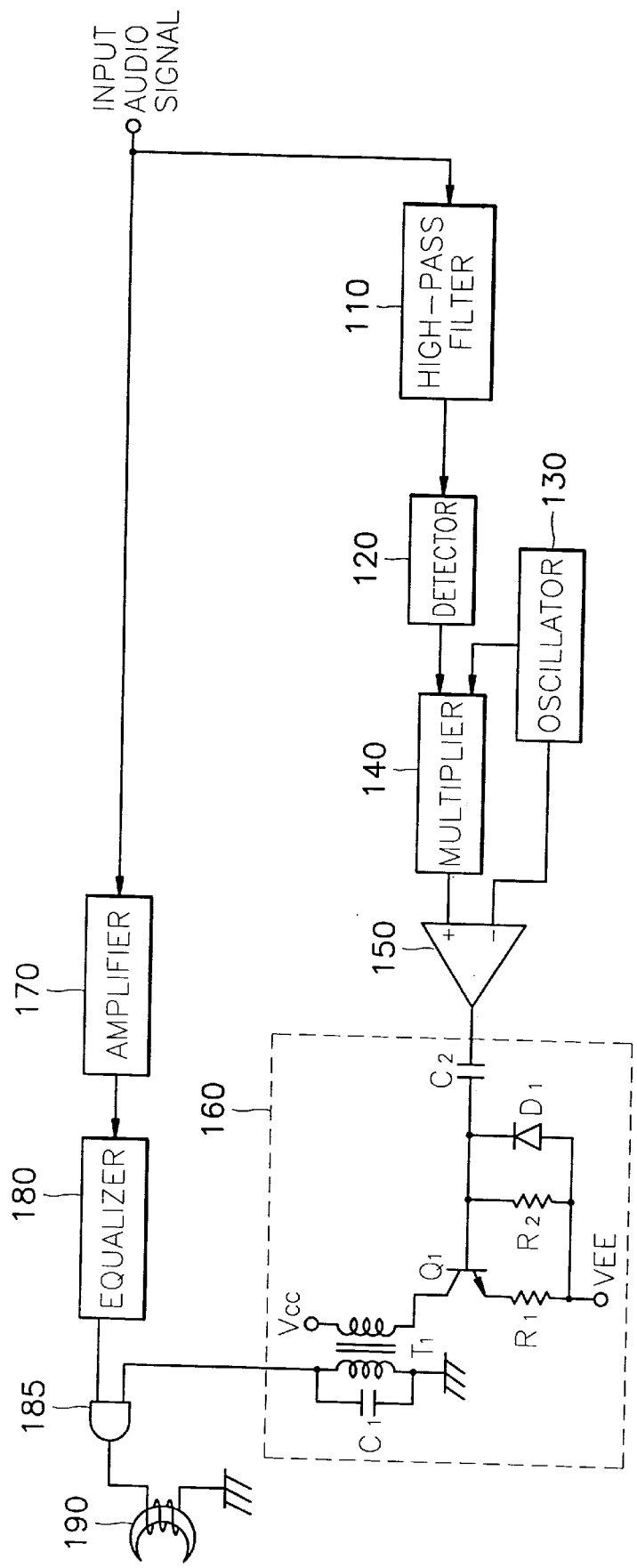

Referring to FIG. 1, the various elements of the apparatus for controlling the audio recording bias according to the invention will first be described. A high-pass filter 110 is connected to the audio input for passing only the high frequency components of an input audio signal. Detector 120 is connected to the output of the high-pass filter 110 for detecting the upper and lower peak levels of the high frequency components of the input audio signal. An oscillator 130 is provided for generating an oscillating signal of a predetermined frequency. A multiplier 140 is connected to detector 120 and oscillator 130 for multiplying the detector output and the oscillator output. A differential amplifier 150 is provided for forming the difference between the multiplier output and the oscillator output. A level controller 160 is connected to the differential amplifier 150 for generating an output signal having a DC level proportional to that of the signal input from the differential amplifier 150.

An amplifier 170 and an equalizer 180 are connected in parallel with the above detailed arrangement. The amplifier 170 is provided for amplifying the input audio signal, and the equalizer 180 is provided for changing the frequency characteristics of the input audio signal. The outputs of the level controller 160 and equalizer 180 are applied to magnetic head 190 via adder 185.

The operation of the above-listed elements will now be described. The high-pass filter 110 passes only the high frequency components of the input audio signals and amplifies them to an appropriate level in order to improve the self-bias effect, by which each high frequency component of the input audio signal itself performs a biasing function during recording. The detector 120 detects the peak level of the output of the high-pass filter 110, and outputs the detected signal to the multiplier 140. The oscillator 130 generates a sinusoidal bias oscillation signal of a predetermined frequency higher than that of the audio input signal, so as to record an audio signal using the AC biasing method. The multiplier 140 forms the product of the detector output and the oscillator output, and supplies this product to the differential amplifier 150.

Accordingly, the output signal of the multiplier 140 in the high-frequency region is thus obtained by multiplying the peak value of the input audio signal and the sinusoidal bias oscillation signal. The output signal in the middle- or low-frequency region is a sinusoidal bias oscillation signal having a predetermined DC level.

The differential amplifier 150 receives the output signal from the multiplier 140 as its non-inverting input, and the oscillating signal from the oscillator 130 as its inverting input, and forms the difference between these signals. That is, the differential amplifier 150 outputs an oscillating signal whose level is inversely proportional to that of the high-frequency components of the input audio signal.

Finally, the output of the differential amplifier 150 is applied to the level controller 160 in order to control the bias level of the input audio signal.

As shown in FIG. 1, the level controller 160 may comprise a transformer T1, a transistor Q1, resistors R1 and R2, a diode D1, and capacitors C1 and C2. The source voltages Vcc and VEE in the level controller 160 denote reference voltages.

In the level controller 160, the output signal of the differential amplifier 150 is applied to the transistor Q1. Consequently, current proportional to the level of the input audio signal flows in the primary coil of the transformer T1, so that the voltage induced in the secondary coil of the transformer T1 is proportional to the level of the signal input to the level controller 160.

Thus, the level controller 160 generates an oscillating bias signal having a constant DC level which is below a predetermined level of the input audio signal, and generates an oscillating bias signal having a level inversely proportional to the level of the high-frequency components of the input audio signal over a predetermined level.

The input audio signal, which is applied to the high-pass filter 110 to control the bias level, is also applied to the equalizer 180 to compensate the frequency characteristics after it has been amplified to a predetermined gain value by the amplifier 170. The frequency-compensated audio input signal from the equalizer 180 is added via an adder 185 to the oscillating bias signal from the level controller 160, and the sum is applied to the audio recording head 190 to be recorded on a recording medium.

In summary, using the bias signal generator of the invention, the middle- and low-frequency components of the input audio signal are biased using an oscillating signal of a predetermined level, while the high-frequency components are biased using an oscillating signal whose level is inversely proportional to the level of the input audio signal. Therefore, saturation of the high-frequency components due to the "self-bias effect" is prevented, the frequency range of the signal being recorded is expanded, and the level of the recording signal is heightened compared to the conventional art, thereby improving the S/N ratio of the high frequency components.

What is claimed is:

1. An apparatus for controlling an audio recording bias comprising:

a high-pass filter for passing only high frequency components of an input audio signal; and a bias signal generator for generating an oscillating bias signal which is inversely proportional to the level of said high-pass filtered audio signal in the high-frequency region of said input audio signal, and is of a predetermined level in the middle- and low-frequencies of said input audio signal, wherein said bias signal generator comprises:

a detector for detecting upper and lower peak levels of the high-pass filtered audio signal;

an oscillator for generating an oscillating signal of a predetermined frequency to bias said input audio signal when recorded;

a multiplier for multiplying said oscillating signal by an output signal of said detector and generating a multiplied output signal;

a differential amplifier for generating a controlling bias signal as a differential signal of said multiplied output signal and said oscillating signal; and a level controller for generating said oscillating bias oscillating signal proportional to the level of said controlling bias signal.

2. An apparatus for controlling an audio recording bias as claimed in claim 1, wherein said level controller includes at least one transformer and a transistor and controls a bias level using a current value of said transistor.

3. An apparatus for controlling an audio recording bias as claimed in claim 1, wherein the level of said oscillating bias signal in the high-frequency region of said input signal is set to be less than the predetermined level in the middle- and low-frequency regions of the input audio signal.

4. An apparatus for controlling an audio recording bias as claimed in claim 1, wherein said differential amplifier applies said multiplied output signal to a non-inversion input port and said bias oscillating signal to an inversion input port.

* * * * *